United States Patent [19]

Nickerson, Jr.

[11] 3,926,240
[45] Dec. 16, 1975

[54] AUXILIARY TRACTION MEANS FOR VEHICLE WHEELS

[76] Inventor: Bryan W. Nickerson, Jr., 200 Lore Ave., Wilmington, Del. 19809

[22] Filed: Nov. 16, 1972

[21] Appl. No.: 307,115

[52] U.S. Cl. .............................. 152/226; 152/208
[51] Int. Cl.² .......................................... B60C 27/02
[58] Field of Search ................ 152/226, 330 R, 208

[56] References Cited
UNITED STATES PATENTS

| | | | |
|---|---|---|---|
| 2,017,891 | 10/1935 | Briggs | 152/208 |
| 2,678,674 | 5/1954 | Thompson | 152/208 |
| 2,943,662 | 7/1960 | Renwick | 152/208 |
| 3,068,925 | 12/1962 | Stephens | 152/226 |
| 3,095,918 | 7/1963 | Mike | 152/208 |
| 3,736,970 | 6/1973 | Clark | 152/226 |

FOREIGN PATENTS OR APPLICATIONS

| | | | |
|---|---|---|---|
| 40,861 | 2/1969 | Finland | 152/226 |
| 216,287 | 8/1941 | Sweden | 152/226 |
| 2,480 | 9/1910 | United Kingdom | 152/226 |

*Primary Examiner*—Robert J. Spar
*Assistant Examiner*—Kenneth Noland
*Attorney, Agent, or Firm*—Robb & Robb

[57] ABSTRACT

Auxiliary traction means for increasing the traction of automotive vehicle wheels during travel over yielding surfaces such as those covered with snow, wherein the traction means includes a plurality of traction lugs yieldingly mounted on one lateral face of the traction wheel and extending laterally therefrom, said lugs being normally radially retracted and confined within the peripheral boundary of the wheel when traveling on an unyielding surface, but being automatically movable radially outwardly beyond the peripheral boundary of the wheel responsive to encountering a yielding surface.

1 Claim, 9 Drawing Figures

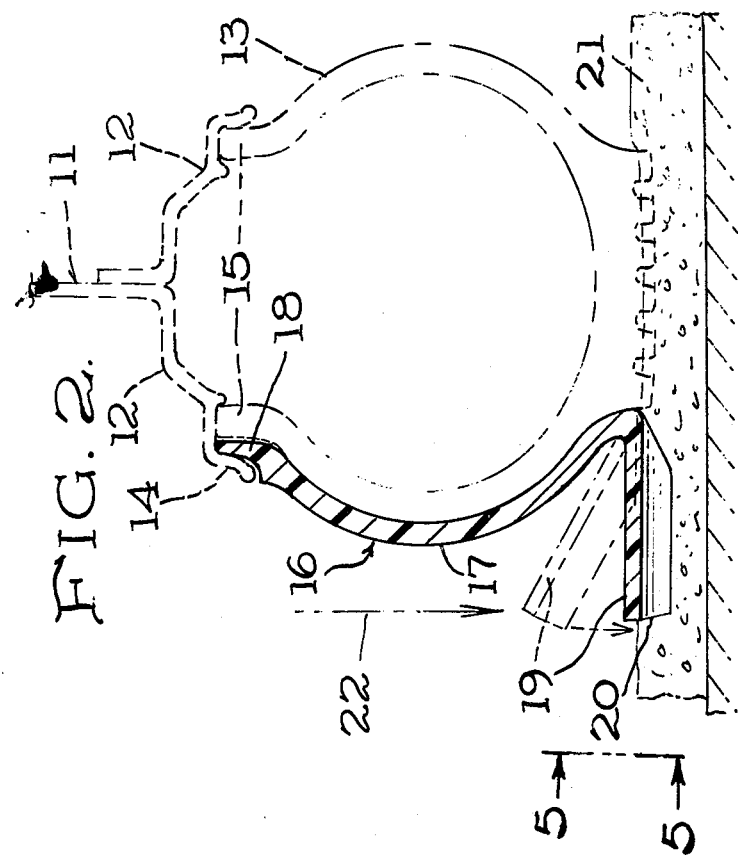
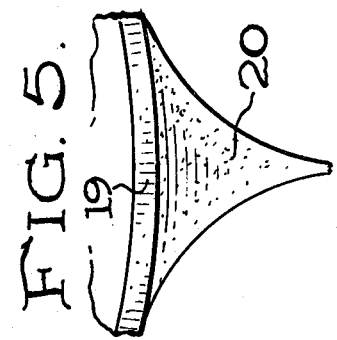
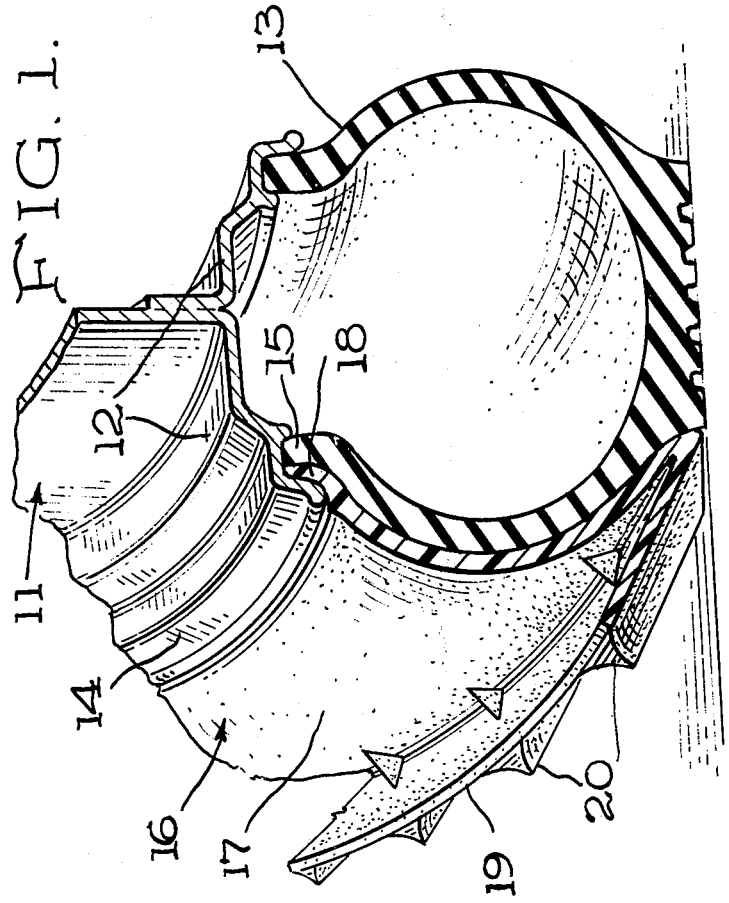
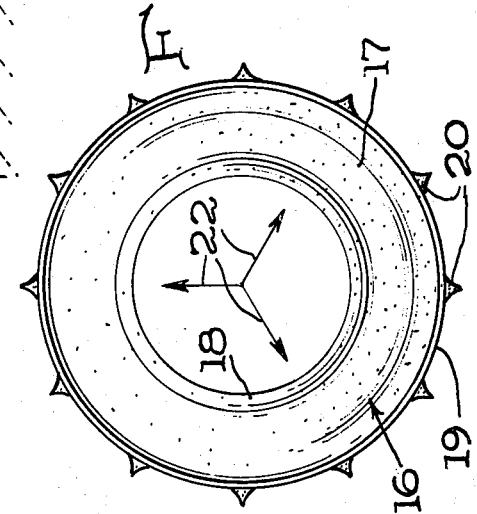
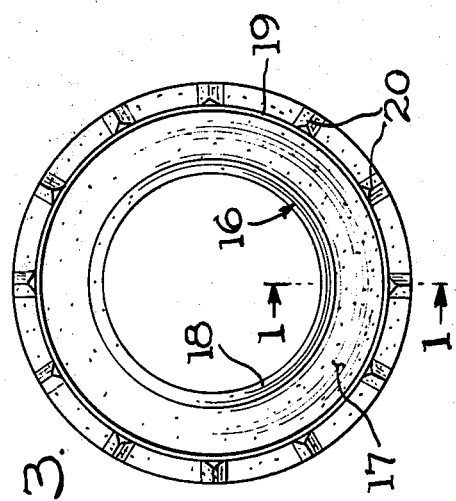

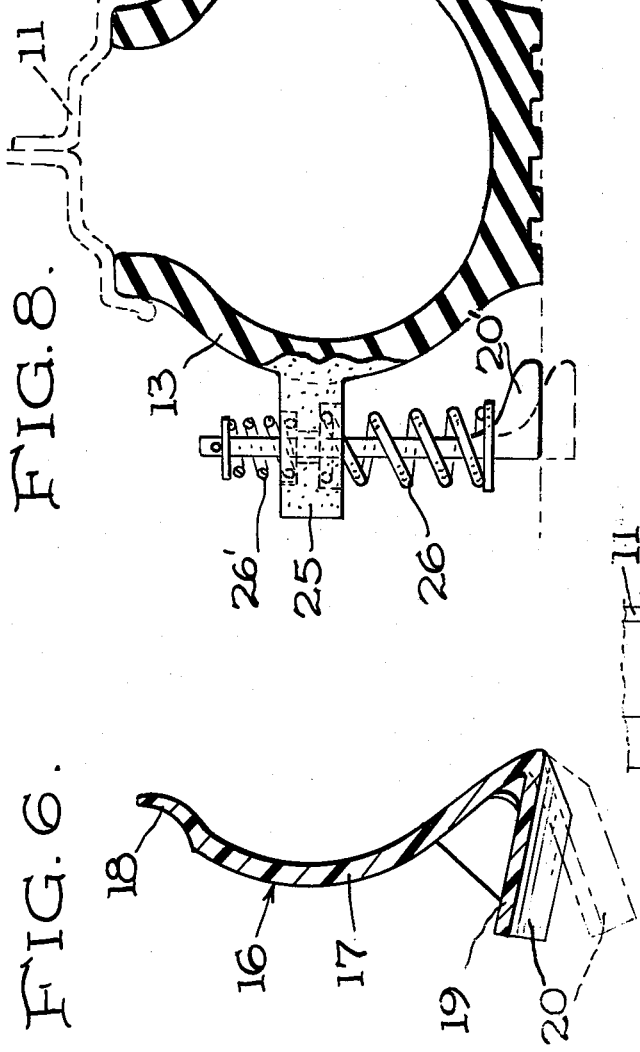

AUXILIARY TRACTION MEANS FOR VEHICLE WHEELS

The present invention relates to auxiliary traction means for vehicle wheels, and more particularly, to traction means for automotive vehicle traction wheels having pneumatic tires and which serve to improve the operation of such traction wheels under changing road conditions ranging from clear, relatively unyielding surfaces, to those covered with snow and presenting a relatively yielding surface, said traction means being fully automatic in activation and deactivation incident to transition of the surface conditions encountered by the traction wheels.

At the present time, there are in general two types of traction means commonly used for winter driving, namely, traction chains and snow tires, neither of which is entirely satisfactory, and their shortcomings are well known. While traction chains are fairly effective on snow-covered surfaces of various depths, their application to the vehicle wheels is somewhat troublesome and inconvenient, especially in foul weather. Moreover, bare or cleared roadway surfaces are usually encountered even when snow is present in other areas in sufficient amounts to initially dictate the use of chains, and when the chains are being operated on clear surfaces or on those which are only lightly covered with snow or hard ice, they produce annoying bumps or jars as the traction wheels roll over the cross-chains, and if used frequently or for prolonged periods of time, the cross-chains will wear out rather quickly and will ultimately break, often causing serious or extensive damage to the vehicle fender.

Alternatively, snow tires are presently more commonly used, and are usually mounted on the vehicle traction wheels in the fall season for continuous operation through the winter season, even though there may be little or no snow-fall at all. Consequently, snow tires are subjected to wear whether they are needed or not, and some motorists may wear out several sets of snow tires without ever encountering any snow. While snow tires are fairly effective in snow depths not exceeding 4 or 5 inches, they are not much more effective than ordinary tires in snow depths above this range. Moreover, snow tires usually cause annoying vibrations in the vehicle, accompanied by a humming sound attributed to their coarse tread, and the motorist must tolerate these annoyances for approximately four to six months of each year.

It is, therefore, the primary object of the present invention to provide improved traction means for automotive traction wheels which are completely inoperative or inactive when not needed, as when the vehicle is travelling on clear or unyielding surfaces, but which automatically become operative or active when needed to provide the desired degree of traction as needed in snow or other comparable relatively yielding surfaces.

It is also an object of my invention to combine the best features of tractionless automotive vehicle operation with traction operation by providing the vehicle traction wheels with improved traction means that are thumpless in operation on clear or hard road surfaces, yet which produce sufficient traction on snow-covered roads, all without any effort or special control on the part of the operator of the vehicle.

A further object of the invention is to provide improved traction means for automotive vehicle traction wheels which is simple and relatively inexpensive in form and operation, and which can be readily applied to any conventional automotive vehicle wheel assembly.

A still further object of the invention is to provide an improved traction means of the aforementioned type which is automatically responsive to centrifugal force generated by rotation of the vehicle wheel on a snow-covered surface.

Other and further objects of my invention will be hereinafter described or will become obvious from reference to the following description and the accompanying drawings, and the novel features thereof will be defined in the appended claims.

In the drawings:

FIG. 1 is a perspective cross-sectional view of the preferred form of my invention as applied to the inboard face of a conventional automotive vehicle traction wheel and as it is operating on a relatively unyielding road surface that is bare or clear of snow, with the cross-section taken through the traction means substantially on the line 1—1 of FIG. 3;

FIG. 2 is a cross-sectional view taken through the rim and tire portion of the vehicle wheel of FIG. 1, with the traction lugs shown in full lines in an operative or active condition as when rolling over a relatively yielding surface such as a snow-covered roadway;

FIG. 3 is a view in side elevation of the traction means unit per se of FIGS. 1 and 2, with the traction lugs shown in an inactive position;

FIG. 4 is a view in side elevation similar to that of FIG. 3, but with the traction lugs shown in operating or active condition corresponding to that depicted in full lines in FIG. 2;

FIG. 5 is a fragmentary view of one of the traction lugs and its annular supporting foot portion of the traction means, as seen in elevation when viewed on the line 5—5 of FIG. 2;

FIG. 6 is a cross-sectional view as taken through the tractions means per se, being applied to and stressed by the pneumatic tire of the wheel assembly;

FIG. 7 is a cross-sectional view showing a modified form of mounting means for applying the traction means to the vehicle wheel;

FIG. 8 shows a modified form of traction means of the spring-loaded type; and

FIG. 9 shows another modified form of my traction means having a disphragm type of mounting for applying the same to the vehicle wheel.

Like reference characters designate corresponding parts in the various figures of the drawings, wherein 12 denotes the rim portion of a conventional automotive vehicle traction wheel 11 having a pneumatic tire 13 mounted thereon, said wheel rim having the usual rim flange 14 to engage and seal the tire bead 15 when the tire is assembled on the wheel rim.

In one embodiment of my invention, the traction means, which is generally denoted at 16, is preferably mounted on the inboard side of the tire rim assembly of the vehicle traction wheel, and includes an annular body portion 17 having the form of a collar which covers the side wall of the tire and conforms to the contour thereof so as to lie snugly thereagainst when applied to the wheel assembly. Around the inner periphery of the body 17, it is provided with an annular lip 18 which is shaped to fit between the rim flange 14 and the tire bead 15, so as to firmly be secured to the wheel assembly for rotation therewith when the tire 13 is inflated to its normal inflation pressure. This arrangement generally corresponds to that of the ornamental side wall feature of my prior U.S. Pat. No. 2,691,550, issued Oct. 12, 1954, and reissued on Aug. 12, 1958, as U.S. Pat. No. Re. 24,518. However, in the present invention, the body portion extends radially outwardly of the wheel somewhat nearer to the peripheral tread of the tire, and is provided with an annular foot 19 which projects laterally or axially outwardly of the tire contiguous to the tire tread. The foot is relatively thin and flat, and although it is preferably integrally formed with the body 17, it is free to flex in a pivotal manner at its junction with the body 17.

Carried by the body 17 is a series of spaced traction lugs 20, as shown in FIGS. 1 to 7 of the drawings, said lugs being preferably integral with the foot 19 and laterally extended therewith from the wheel assembly, each of said lugs 20 preferably being V-shaped in transverse cross-section, or otherwise shaped to effectively penetrate and provide traction in a yieldable surface such as snow when the traction means is activated as hereinafter more fully described.

In constructing the traction means, it is preferably molded in one-piece from resilient but tough, flexible but relatively stiff material such as tread rubber which is capable of withstanding the stresses and wear to which the same is subjected when in use. Reinforcing materials, such as nylon or wire mesh may be embedded in the rubber material, if desired, to strengthen the rubber material at points of high stress. It is to be understood, however, that my invention is not limited to such specific materials, since other suitable materials, or compositions, including some plastics, may be equally useful, or even superior to conventional tread rubber. The material may be pre-stressed or pre-set and so formed during the molding or other forming procedure as to cause the body 17 to deform with the tire 13 as the latter is inflated so that the body 17 snugly hugs the side wall of the tire and conforms thereto when the tire is inflated to its normal operating pressure, while at the same time, the foot 19 and the traction lugs 20 are initially inclined radially inwardly toward the axis of the wheel assembly, with the heel of the lugs lying close to or lightly pressing against the road surface when the wheel rolls over a bare, relatively unyielding surface, as depicted in FIG. 1.

When the wheel encounters a yielding surface, such as snow as indicated at 21 in FIG. 2, the traction lugs 20 will bite into the snow, and as the wheel picks up speed or spins rapidly, centrifugal force, as represented by the arrows designated 22 in FIGS. 2 and 4, will act on the foot 19 and lugs 20, causing the latter to move radially outwardly to a substantially fully axially extended position to increase the traction effect in the snow. In its preferred embodiment, it is possible to cause said traction lugs to become operative at a predetermined speed of the traction wheel. The point at which this happens depends on several variables, but generally, the weight of the traction lugs in relation to the speed of the wheel is a determining factor. Therefore, one way in which the point of activation of the traction lugs is predetermined may be achieved by controlling the stiffness of the material at the juncture of the lugs or foot and the collar. A further means of controlling the point of activation of the traction lugs is by enhancing the stiffness factor by means of a fill-in at the juncture of the body portion 17 and the foot 19 as shown in FIG. 6 or by providing spaced ribs as shown in FIGS. 1 and 6. Thereafter, if a relatively unyielding surface is encountered by the wheel, such as solid sheet ice or glaze or a substantially bare road surface, the foot 19 and the lugs 20 will resume the inclined position as best shown in FIGS. 1 and 3 and in broken lines in FIG. 2. Thus, the traction means becomes inoperative or inactive when not needed or snow is not present, but automatically becomes operative when snow is encountered, as determined by the character of the road surface.

As a scientific principle, control of the point of activation of the traction lugs is grounded on the phenomenon of centrifugal force that as the revolutions of the wheel increase at a normal rate, the power of the centrifugal force increases by its own square. The significance of this face is that the effect of the centrifugal force is building up at a much faster rate relative to the speed of the wheel. Therefore the unique application of the above phenomenon in the present invention is such that resistance to radiation by the traction lugs is built into the structure made possible by its novel form in conjunction with the material used. Since the amount of resistance built into the structure is a controllable factor, it is possible to predetermine the point or speed at which said resistance will literally be overcome by the fast building centrifugal force and cause the traction lugs to radiate outwardly past the outer periphery of the tire. Until such time as that critical point is reached, the traction lugs are in a retracted position all of which make possible the new result of providing zero traction when it is not needed and full traction when it is needed. Furthermore, the foregoing is done automatically by controlling the speed of the wheel on which the traction means is mounted.

In lieu of attaching the lip 18 of the body or collar 17 to the wheel 11 by clamping the same between the tire bead 15 and the rim flange 14, the traction means may be attached to the wheel in any other suitable manner, as by shaping the body portion 17 so as to fit over the flat shoulder 23 of the rim on which it can be anchored by a tight-fitting clamping ring or band 24, as illustrated in FIG. 7, or in any other suitable manner. In such an arrangement, the traction means corresponds to and functions like that of FIGS. 1–5, inclusive.

Instead of being constructed as a separate attachment for the vehicle wheel, my improved traction means may be fabricated as an integral part of any conventional pneumatic tire, as by directly molding the traction lugs 20 onto the side wall of the tire, contiguous to the tire tread.

Referring to FIG. 8 of the drawings, I have shown a modified form of the traction means wherein the traction lugs 20' are so formed as to be radially movably mounted in a mounting 25 extended laterally from the side wall of the tire 13, and the lugs being preferably spring-loaded by coil springs 26, 26' which are yieldable to allow radially outward movement of the traction lugs, aided by centrifugal forces produced by rotation of the vehicle wheel at or above any predetermined speed, in substantially the same manner as in FIGS. 1 to 7.

FIG. 9 shows another modification, generally similar to that of FIG. 8, but in which a resilient diaphragm 26" is substituted for the coil springs 26, 26' and from which the traction lugs 20" are suspended so as to be yieldably movable radially from a normally inactive position to an automatically active position as needed, according to the relative yieldability of the surface over which the wheel travels.

While the specific details of several forms of my invention have been shown and described herein, the invention is not confined thereto, and other changes or alterations can be made without departing from the spirit thereof as defined in the appended claims.

I claim:

1. The combination with a vehicle wheel and tire having its outer periphery adapted to roll over surfaces ranging in hardness from unyielding to yielding, traction means mounted on said wheel and tire, said traction means constructed of a resilient material in the form of an annular collar in opposed relationship to the lateral face of the side wall of said tire and a plurality of spaced traction lugs arranged contiguous the outer periphery of said collar, said traction lugs inoperatively positioned radially within the outer periphery of said tire, said traction lugs being responsive to the centrifugal force of said wheel whereby they are caused to radiate outwardly beyond the outer periphery of said tire, there being a resistance means associated with said collar and said traction lugs causing said traction lugs to resist being radiated outwardly relative to said collar, the radially inner portion of said collar remains fixed relative to the lateral face of said tire, said resistance means characterized as a resilient stiffness that will cause said traction lugs to resist being radiated outwardly beyond the outer periphery of said tire until a predetermined number of revolutions per minute of said wheel is reached whereby the activation of said traction lugs is dependent upon the elective speed of the wheel.

* * * * *